(12) United States Patent
Mosley, Jr. et al.

(10) Patent No.: US 7,664,472 B2
(45) Date of Patent: Feb. 16, 2010

(54) REDUCING THE PEAK-TO-AVERAGE POWER RATIO OF A SIGNAL

(75) Inventors: William H. Mosley, Jr., Seminole, FL (US); William E. Coleman, Jr., Clearwater, FL (US); Mark A. Gloudemans, Fort Wayne, IN (US); Bror W. Peterson, Murphy, TX (US); Jayanti Patel, Saint Petersburg, FL (US)

(73) Assignee: Raytheon Company, Waltham, MA (US)

( * ) Notice: Subject to any disclaimer, the term of this patent is extended or adjusted under 35 U.S.C. 154(b) by 736 days.

(21) Appl. No.: 11/361,641

(22) Filed: Feb. 23, 2006

(65) Prior Publication Data

US 2007/0197210 A1  Aug. 23, 2007

(51) Int. Cl.
*H04B 17/00* (2006.01)
*H04B 1/04* (2006.01)

(52) U.S. Cl. .................. 455/91; 455/67.13; 455/114.2; 455/115.1; 455/127.1; 375/296

(58) Field of Classification Search .............. 455/67.11, 455/67.13, 114.1–115.4, 116, 127.1; 375/146, 375/296–297
See application file for complete search history.

(56) References Cited

U.S. PATENT DOCUMENTS

| | | | | |
|---|---|---|---|---|
| 6,038,261 | A | 3/2000 | Mestdagh | 375/285 |
| 6,504,862 | B1* | 1/2003 | Yang | 375/146 |
| 7,187,722 | B2* | 3/2007 | Peeters | 375/296 |
| 2004/0076247 | A1 | 4/2004 | Barak et al. | 375/350 |
| 2004/0090283 | A1* | 5/2004 | Naito | 333/17.2 |
| 2004/0203430 | A1* | 10/2004 | Morris | 455/67.11 |
| 2004/0234006 | A1* | 11/2004 | Leung | 375/316 |
| 2007/0121483 | A1* | 5/2007 | Zhang et al. | 370/208 |
| 2007/0140101 | A1* | 6/2007 | Guo et al. | 370/204 |
| 2008/0031380 | A1* | 2/2008 | Takabayashi | 375/297 |

FOREIGN PATENT DOCUMENTS

GB  2 364 488 A  1/2002

OTHER PUBLICATIONS

E. Lawrey, et al., "*Peak To Average Power Ratio Reduction Of OFDM Signals Using Peak Reduction Carriers*", Fifth International Symposium on Signal Processing and its Applications, ISSPA '99, Brisbane, Australia, 4 pages, Aug. 22-25, 1999.

(Continued)

*Primary Examiner*—Simon D Nguyen
(74) *Attorney, Agent, or Firm*—Baker Botts L.L.P.

(57) ABSTRACT

Reducing the peak-to-average power ratio of a signal comprises receiving the input signal, where the input signal is associated with at least one unacceptable frequency range. The input signal is clipped about an amplitude range to yield a clipped signal and clipped information, where the clipped information represents intermodulation products. The clipped information is filtered to yield an error signal. The error signal represents a subset of the intermodulation products, where an intermodulation product of the subset corresponds to the unacceptable frequency range. The error signal is subtracted from the input signal to yield an output signal.

18 Claims, 1 Drawing Sheet

OTHER PUBLICATIONS

Seung Hee Han, et al., "*Peak-to-Average Power Ratio Reduction of an OFDM Signal by Signal Set Expansion*", cctlab01.snu.ac.kr/nrl/conference/ICC2004_Han.pdf, 5 pages, 2004.

Mei Chen, et al., "*Trellis Pruning for Peak-to-Average Power Ratio Reduction*", arXiv:cs.IT/0511037 v1, 5 pages, Nov. 8, 2005.

EPO Communication pursuant to Article 94(3) EPC; Application No. 07 750 847.1-1246; Ref. 064750.0538, 5 pages, Feb. 9, 2009.

PCT Notification of Transmittal of the International Search Report and the Written Opinion of the International Searching Authority, or the Declaration with attached PCT International Search Report and Written Opinion of the International Searching Authority in International Application No. PCT/US 2007/004038, dated Aug. 3, 2007, 10 pages, Aug. 3, 2007.

\* cited by examiner

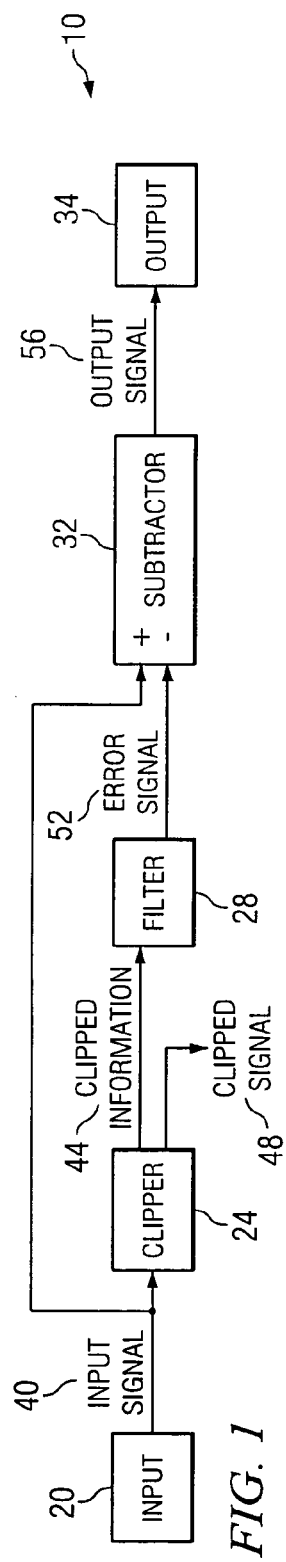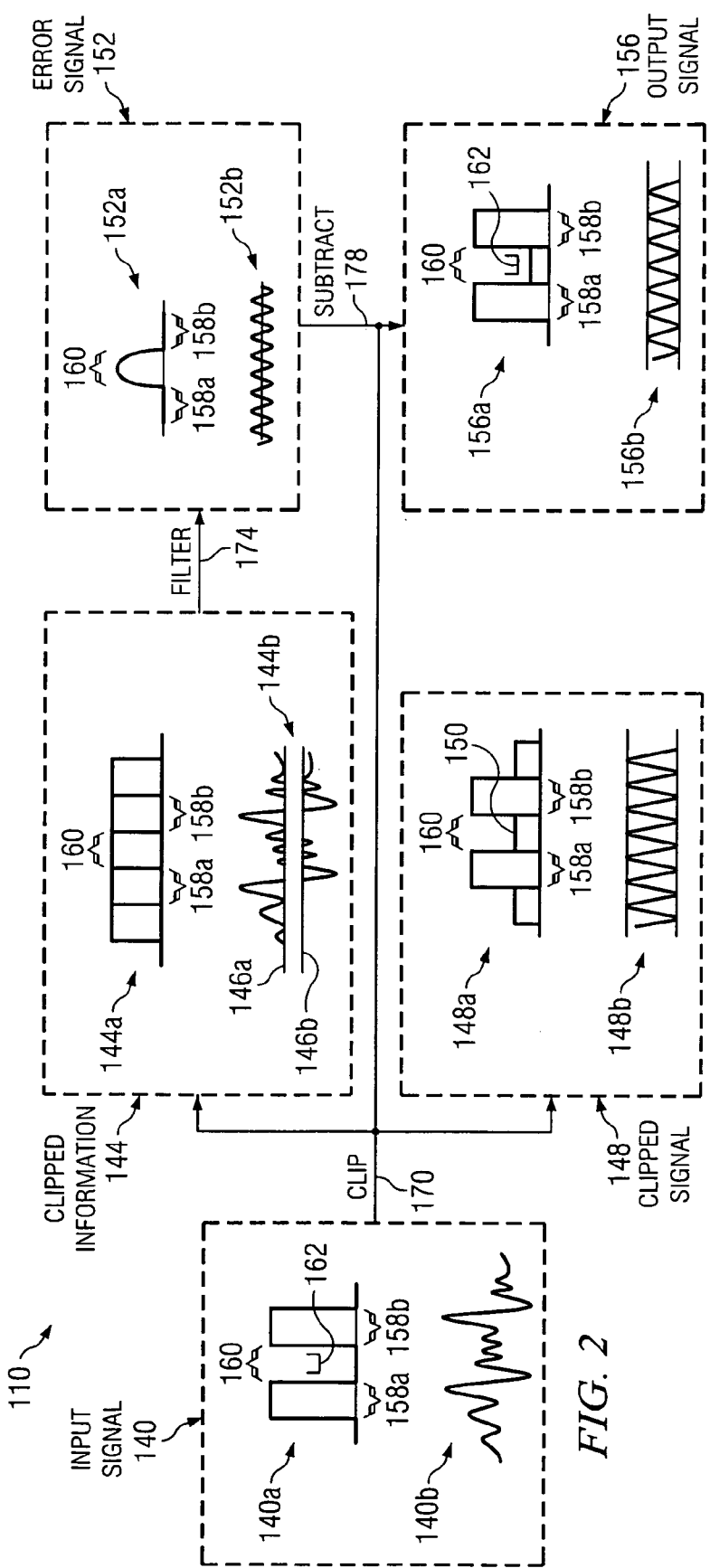

US 7,664,472 B2

REDUCING THE PEAK-TO-AVERAGE POWER RATIO OF A SIGNAL

GOVERNMENT FUNDING

The U.S. Government may have certain rights in this invention as provided for by the terms of Grant No. N00039-02-C-3296 Mobile User Objective System awarded by the U.S. Navy.

TECHNICAL FIELD

This invention relates generally to the field of signal processing and more specifically to reducing the peak-to-average power ratio of a signal.

BACKGROUND

A power amplifier amplifies signals. In general, reducing the peak-to-average power ratio (PAPR) of the signals may increase the power efficiency of the amplifier. Reducing the peaks of the signals may reduce the required peak power capacity of the power amplifier, which may increase power efficiency. Reducing the peaks, however, may produce spectral splatter into restricted frequency ranges. Known techniques for compensating for the spectral splatter involve filtering the signal. The known techniques for filtering the signal, however, are inefficient in certain situations. It is generally desirable to efficiently compensate for spectral splatter.

SUMMARY OF THE DISCLOSURE

In accordance with the present invention, disadvantages and problems associated with previous techniques for reducing the peak-to-average power ratio of a signal may be reduced or eliminated.

According to one embodiment of the present invention, a method for reducing the peak-to-average power ratio of a signal comprises receiving the input signal, where the input signal is associated with at least one unacceptable frequency range. The input signal is clipped about an amplitude range to yield a clipped signal and clipped information, where the clipped information represents intermodulation products. The clipped information is filtered to yield an error signal. The error signal represents a subset of the intermodulation products, where an intermodulation product of the subset corresponds to the unacceptable frequency range. The error signal is subtracted from the input signal to yield an output signal.

According to one embodiment of the present invention, a system for reducing the peak-to-average power ratio of a signal comprises an input operable to receive an input signal associated with at least one unacceptable frequency range. A clipper is operable to clip the input signal about an amplitude range to yield a clipped signal and clipped information, where the clipped information represents intermodulation products. A filter is operable to filter the clipped information to yield an error signal. The error signal represents a subset of the plurality of intermodulation products, and an intermodulation product of the subset corresponds to the unacceptable frequency range. A subtractor is operable to subtract the error signal from the input signal to yield an output signal.

Certain embodiments of the invention may provide one or more technical advantages. A technical advantage of one embodiment may be that an error signal may be generated from information clipped from an input signal during a peak reduction process. The error signal may be used to compensate for spectral splatter.

Another technical advantage of one embodiment may be that the error signal may be generated by filtering the clipped information using a bandpass filter with a relatively shallow skirt. A bandpass filter with a shallow skirt may relatively efficiently compensate for spectral splatter.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a system that may be used to reduce the peak-to-average power ratio of a signal; and FIG. 2 is a signal diagram illustrating one embodiment of a method that may be used to reduce the peak-to-average power ratio of a signal.

DETAILED DESCRIPTION OF THE DRAWINGS

Embodiments of the present invention and its advantages are best understood by referring to FIGS. 1 and 2 of the drawings, like numerals being used for like and corresponding parts of the various drawings.

FIG. 1 is a block diagram illustrating one embodiment of a system 10 that may be used to reduce the peak-to-average power ratio of a signal. According to the embodiment, information may be clipped from an input signal during a peak reduction process. The clipped information may be filtered using a bandpass filter with a relatively shallow skirt to generate an error signal. The error signal may then be used to compensate for spectral splatter. System 10 may be utilized with any suitable device, for example, a linear power amplifier.

According to one embodiment, system 10 reduces the peak-to-average power ratio of a signal by reducing the maximum of the peaks of the signal and then compensating for spectral splatter. A signal may refer to an electrical quantity, such as current or voltage, that may be used to convey information. A signal may have any suitable bandwidth, for example, up to 300 MHz. In some cases, a signal may be constrained to certain acceptable frequency ranges, and may be restricted from certain unacceptable frequency ranges.

A peak-to-average power ratio may refer to the ratio between the peaks of a signal and the average of the signal. The peak-to-average power ratio may be reduced by truncating the peaks to reduce the maximum of the peaks. Truncating the peaks, however, may yield spectral splatter of intermodulation products. In some cases, the intermodulation products may fall into unacceptable frequency ranges. The signal may be filtered to reduce the products in the unacceptable frequency ranges below an intermodulation threshold.

According to the illustrated embodiment, system 10 includes an input 20, a clipper 24, a filter 28, a subtractor 32, and an output 34 coupled as shown. According to one embodiment of operation, input 20 receives input signal 40. Clipper 24 clips input signal 40 to yield clipped information 44 and a clipped signal 48. Filter 28 filters clipped information 44 to yield an error signal 52. Subtractor 32 subtracts error signal 52 from input signal 40 to yield an output signal 56 that has a reduced peak-to-average power ratio. Output 34 outputs output signal 56. System 10 may comprise a field programmable gate array (FPGA) digital signal processing (DSL) system.

According to one embodiment, clipper 24 clips input signal 40 to yield clipped signal 48 and clipped information 44. Clipping a signal may refer to constraining the magnitude of the signal to a particular amplitude range. The phase of the signal may remain unmodified. Clipped signal 48 may refer to the portion of input signal 40 within the amplitude range, and clipped information 44 may refer to the portion of input signal 40 outside of the amplitude range.

Clipped signal 48 may be described by a clip function $C(x,c)$ for a complex number x and a real magnitude threshold c given by the following equation:

$$C(x, c) = \begin{cases} x, & |x| < c \\ \dfrac{cx}{|x|}, & |x| \geq c \end{cases}$$

Clip function $C(x,c)$ may be performed in any suitable manner. For example, the function may be performed using a rough scaling operation and a small table lookup.

Clipped information 44 may be described by an error function $E(x,c)$ given the following equation:

$$E(x,c) = x - C(x,c)$$

Clipped information 44 may represent intermodulation products. An intermodulation product may refer to a signal product resulting from intermodulation of one signal by another signal.

According to one embodiment, filter 28 filters clipped information 44 to generate error signal 52. Error signal 52 may represent intermodulation products that are substantially within particular frequency ranges, such as unacceptable frequency ranges. According to the embodiment, filter 28 may comprise a bandpass filter that passes through specific frequency bands, such as frequency bands associated with the unacceptable frequency ranges. Filter 28 may be implemented as a finite impulse response (FIR) or a fast Fourier transform (FFT) filter.

According to one embodiment, filter 28 may comprise a first mask and a second mask. The first mask may be constructed by capping a mask defining the unacceptable frequency ranges at power flux density limits. The maximum gain may be normalized to zero db. The second mask may be created by setting each point of the second mask to the minimum value of the first mask within a distance of 175 KHz. Any point of the second mask specifying a loss greater than 20 db may be set to zero, and the other points may be transformed to their equivalent linear gain. The second mask may then be converted from the frequency domain to the time domain using an inverse fast Fourier transform. The resulting time domain signal may be windowed using a 127 point Kaiser window to yield filter 28.

According to one embodiment, subtractor 32 subtracts error signal 52 from input signal 40 to yield an output signal 56 that has a reduced peak-to-average power ratio. Subtractor 32 may subtract error signal 52 from input signal 40 by adding error signal 52 in a phase opposite to that of input signal 40. According to one embodiment, error signal 52 may be amplified prior to subtraction by, for example, using a multiplicative scaling block.

Any suitable sampling frequency may be used for output signal 56. As an example, the sampling frequency may be selected in accordance with a rate for a subsequent device, such as a predistorter. For example, a sampling rate of approximately 40 MHz for input signal 40 and a sampling rate of approximately 160 MHz for output signal 56 may be used.

In certain situations, system 10 may provide for more efficient reduction of the peak-to-average power ratio. As an example, conventional peak-to-average power ratio reduction may apply a notch filter to clipped signal 48 to reduce the intermodulation products of the spectral splatter. A notch filter may refer to a frequency rejection filter, such as a band-suppression filter, operable to produce a notch in a signal. To sufficiently reduce the intermodulation products, the notch filter may be required to have a very steep skirt. A skirt of a filter may refer to the response of a filter from unity to zero or from zero to unity.

Instead of filtering clipped signal 48 with a notch filter, system 10 may filter clipped information 44 with a bandpass filter. Typically, the bandpass filter may have a shallower skirt than that of the notch filter. Accordingly, in certain situations, system 10 may provide for more efficient reduction of the peak-to-average power ratio than conventional peak-to-average power ratio reduction.

Accordingly, system 10 may be utilized in systems where smaller and lighter devices may be desirable. As an example, the power amplifier may be used in a satellite system. In the example, system 10 may be used in a satellite system that includes a channelizer, a power amplifier, a combiner, and an antenna. The channelizer generates channel signals from an input signal. System 10 reduces the peak-to-power ratio of a channel signal. The power amplifier amplifies the signal with the reduced peak-to-power ratio. The combiner combines channel signals from the different channels. The antenna transmits the combined signals.

System 10 may operate under any suitable system requirements. According to one embodiment, system 10 may be used in a satellite system with requirements for power flux density, phase noise, inter-modulation product power, adjacent channel interference, in-band spurious response, other feature, or any combination of the preceding.

As an example, power flux density requirements may include limitations on ground power flux density (PFD) and satellite effective isotropic radiated power (EIRP) for center and edge channels. In the example, limitations on the ground PFD and the satellite EIRP for the center channel may be approximately $-138$ dBm/(Hz m$^2$) and 24 dBm/Hz, and the limitations on the ground PFD and the satellite EIRP for the edge channel may be approximately $-168.8$ dBm/(Hz m$^2$) and $-6.8$ dBm/Hz.

As another example, in-band spurious response requirements may specify that, excluding thermal noise and inter-modulation products, spurious outputs in a 100 Hz bandwidth in the nominal transmit bandwidth of a ultra-high frequency (UHF) channel should be at least 40 db below the desired output signal for illumination within the dynamic range.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of clipper 24 and filter 28 may be performed by one module, or the operations of filter 28 may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a signal diagram 110 illustrating one embodiment of a method that may be used to reduce the peak-to-average power ratio of a signal. According to the embodiment, information may be clipped from an input signal during a peak reduction process. The clipped information may be filtered using a bandpass filter with a relatively shallow skirt to generate an error signal. The error signal may then be used to compensate for spectral splatter.

Signal diagram 110 illustrates an input signal 140 that is clipped to yield clipped information 144 and clipped signal 148. Clipped information 144 is filtered to yield an error signal 152. Error signal 152 is subtracted from input signal 140 to yield output signal 156.

Signal diagram 110 illustrates the signals in the frequency domain and the time domain. According to the illustrated embodiment, signal 140a represents input signal 140 in the frequency domain, and signal 140b represents input signal 140 in the time domain. Signal 144a represents clipped information 144 in the frequency domain, and signal 144b represents clipped information 144 in the time domain. Signal 148a represents clipped signal 148 in the frequency domain, and signal 148b represents clipped signal 148 in the time domain. Signal 152a represents error signal 152 in the frequency domain, and signal 152b represents error signal 152 in the time domain.

According to the illustrated embodiment, frequency domain input signal 140a has acceptable frequency ranges 158 and an unacceptable frequency range 160. Acceptable frequency ranges 158 may represent, for example, frequency ranges that are authorized for use by a satellite, and unacceptable frequency range 160 may represent, for example, a frequency range that the satellite is prohibited from using. An intermodulation threshold 162 of unacceptable frequency range 160 represents a minimum below which the amplitude of a signal should be within unacceptable frequency range 160.

According to one embodiment of the method, input signal 140 is clipped at step 170 to yield clipped information 144 and clipped signal 148. Clipped signal 148 may represent input signal 140 with reduced peaks, and clipped information 144 may represent intermodulation products. Time domain clipped information 144b includes an upper portion 146a and a lower portion 146b that are clipped from time domain input signal 140b to yield time domain clipped signal 148b. Upper portion 146a may comprise upper amplitude peaks greater than an amplitude range, and lower portion 146b may comprise lower amplitude peaks less than the amplitude range. Frequency domain clipped signal 148a may exhibit intermodulation products 150 within unacceptable frequency range 160. Intermodulation products 150 may result from spectral scatter from clipping input signal 140.

Clipped information 144 is filtered at step 174 to yield error signal 152. Clipped information 144 may be filtered to pass through portions within unacceptable frequency range 160. As shown in the frequency domain, error signal 152a may represent intermodulation products 50 that are substantially within unacceptable frequency range 160. During filtering, upper amplitude peaks 146a may be combined with lower amplitude peaks 146b.

Error signal 152 is subtracted from input signal 140 at step 178 to yield an output signal 156 that has a reduced peak-to-average power ratio. Subtracting error signal 152 from input signal 140 reduces the intermodulation products 150 within unacceptable frequency range 160. The intermodulation products may be reduced to satisfy intermodulation threshold 162.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that an error signal may be generated from information clipped from an input signal during a peak reduction process. The error signal may be used to compensate for spectral splatter.

Another technical advantage of one embodiment may be that the error signal may be generated by filtering the clipped information using a bandpass filter with a relatively shallow skirt. A bandpass filter with a shallow skirt may relatively efficiently compensate for spectral splatter.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for reducing a peak-to-average power ratio of a signal, comprising:
    receiving an input signal, the input signal associated with at least one unacceptable frequency range;
    clipping the input signal about an amplitude range to yield a clipped signal and clipped information, the clipped information representing a plurality of intermodulation products;
    filtering the clipped information to yield an error signal, the error signal representing a subset of the plurality of intermodulation products, an intermodulation product of the subset corresponding to the at least one unacceptable frequency range, the filtering further comprising bandpass filtering the clipped information using a bandpass filter having a shallower skirt, the shallower skirt shallower than a steeper skirt of a notch filter associated with filtering the clipped signal; and
    subtracting the error signal from the input signal to yield an output signal.

2. The method of claim 1, wherein:
    the clipped signal has a first amplitude corresponding to the at least one unacceptable frequency range; and
    the output signal has a second amplitude corresponding to the at least one unacceptable frequency range, the second amplitude less than the first amplitude.

3. The method of claim 1, wherein filtering the clipped information to yield the error signal further comprises:
    bandpass filtering the clipped information to pass through the clipped information corresponding to the least one unacceptable frequency range.

4. The method of claim 1, wherein filtering the clipped information to yield the error signal further comprises:
    combining an upper portion of the clipped information and a lower portion of the clipped information, the upper portion comprising upper amplitude clipped information, the lower portion comprising lower amplitude clipped information.

5. The method of claim 1, wherein subtracting the error signal from the input signal to yield the output signal further comprises:

subtracting the error signal from the input signal to reduce an amplitude of the input signal corresponding to the at least one unacceptable frequency range.

6. The method of claim 1, wherein the at least one unacceptable frequency range represents a prohibited frequency range.

7. The method of claim 1, further comprising:
amplifying the output signal.

8. The method of claim 1, further comprising:
transmitting the output signal from an antenna of a satellite system.

9. A system for reducing a peak-to-average power ratio of a signal, comprising:
an input operable to receive an input signal, the input signal associated with at least one unacceptable frequency range;
a clipper coupled to the input and operable to clip the input signal about an amplitude range to yield a clipped signal and clipped information, the clipped information representing a plurality of intermodulation products;
a filter coupled to the clipper and operable to filter the clipped information to yield an error signal, the error signal representing a subset of the plurality of intermodulation products, an intermodulation product of the subset corresponding to the at least one unacceptable frequency range, the filter comprising a bandpass filter having a shallower skirt, the shallower skirt shallower than a steeper skirt of a notch filter associated with filtering the clipped signal; and
a subtractor coupled to the filter and operable to subtract the error signal from the input signal to yield an output signal.

10. The system of claim 9, wherein:
the clipped signal has a first amplitude corresponding to the at least one unacceptable frequency range; and
the output signal has a second amplitude corresponding to the at least one unacceptable frequency range, the second amplitude less than the first amplitude.

11. The system of claim 9, the filter further operable to filter the clipped information to yield the error signal by:
bandpass filtering the clipped information to pass through the clipped information corresponding to the least one unacceptable frequency range.

12. The system of claim 9, the filter further operable to filter the clipped information to yield the error signal by:
combining an upper portion of the clipped information and a lower portion of the clipped information, the upper portion comprising upper amplitude clipped information, the lower portion comprising lower amplitude clipped information.

13. The system of claim 9, the subtractor further operable to subtract the error signal from the input signal to yield the output signal by:
subtracting the error signal from the input signal to reduce an amplitude of the input signal corresponding to the at least one unacceptable frequency range.

14. The system of claim 9, wherein the at least one unacceptable frequency range represents a prohibited frequency range.

15. The system of claim 9, further comprising:
an amplifier operable to amplify the output signal.

16. The system of claim 9, further comprising:
an antenna of a satellite system, the antenna operable to transmit the output signal.

17. A system for reducing a peak-to-average power ratio of a signal, comprising:
means for receiving an input signal, the input signal associated with at least one unacceptable frequency range;
means for clipping the input signal about an amplitude range to yield a clipped signal and clipped information, the clipped information representing a plurality of intermodulation products;
means for filtering the clipped information to yield an error signal, the error signal representing a subset of the plurality of intermodulation products, an intermodulation product of the subset corresponding to the at least one unacceptable frequency range, the filtering further comprising bandpass filtering the clipped information using a bandpass filter having a shallower skirt, the shallower skirt shallower than a steeper skirt of a notch filter associated with filtering the clipped signal; and
means for subtracting the error signal from the input signal to yield an output signal.

18. A system for reducing a peak-to-average power ratio of a signal, comprising:
an input operable to receive an input signal, the input signal associated with at least one unacceptable frequency range, the at least one unacceptable frequency range representing a prohibited frequency range;
a clipper coupled to the input and operable to clip the input signal about an amplitude range to yield a clipped signal and clipped information, the clipped information representing a plurality of intermodulation products;
a filter coupled to the clipper and operable to filter the clipped information to yield an error signal, the error signal representing a subset of the plurality of intermodulation products, an intermodulation product of the subset corresponding to the at least one unacceptable frequency range, the filter further operable to filter the clipped information to yield the error signal by:
combining an upper portion of the clipped information and a lower portion of the clipped information, the upper portion comprising upper amplitude clipped information, the lower portion comprising lower amplitude clipped information; and
bandpass filtering the clipped information to pass through the clipped information corresponding to the least one unacceptable frequency range, the clipped information bandpass filtered using a bandpass filter having a shallower skirt, the shallower skirt shallower than a steeper skirt of a notch filter associated with filtering the clipped signal;
a subtractor coupled to the filter and operable to subtract the error signal from the input signal to yield an output signal, the error signal subtracted from the input signal to reduce an amplitude of the input signal corresponding to the at least one unacceptable frequency range, the clipped signal having a first amplitude corresponding to the at least one unacceptable frequency range, the output signal having a second amplitude corresponding to the at least one unacceptable frequency range, the second amplitude less than the first amplitude;
an amplifier operable to amplify the output signal; and
an antenna of a satellite system, the antenna operable to transmit the output signal.

* * * * *